United States Patent

Moriya et al.

(10) Patent No.: US 7,079,477 B2
(45) Date of Patent: Jul. 18, 2006

(54) OPTICAL INFORMATION MEDIUM, RECORDING AND REPRODUCTION APPARATUS, AND RECORDING AND REPRODUCTION METHOD

(75) Inventors: Mitsuro Moriya, Nara (JP); Hiromichi Ishibashi, Osaka (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 74 days.

(21) Appl. No.: 10/381,964

(22) PCT Filed: Oct. 1, 2001

(86) PCT No.: PCT/JP01/08657

§ 371 (c)(1),
(2), (4) Date: Jul. 14, 2003

(87) PCT Pub. No.: WO02/29790

PCT Pub. Date: Apr. 11, 2002

(65) Prior Publication Data

US 2004/0037184 A1  Feb. 26, 2004

(30) Foreign Application Priority Data

Oct. 3, 2000  (JP)  ............................. 2000-303373

(51) Int. Cl.
*G11B 7/00* (2006.01)
(52) U.S. Cl. .............................. 369/275.3; 369/47.19; 369/59.25
(58) Field of Classification Search ............ 369/275.3, 369/275.2, 275.4, 44.26, 59.14, 59.25, 47.19
See application file for complete search history.

(56) References Cited

U.S. PATENT DOCUMENTS

| 4,523,304 | A | 6/1985 | Satoh et al. ................... 369/32 |
| 5,602,823 | A | 2/1997 | Aoki et al. ............... 369/275.3 |
| 5,812,520 | A | 9/1998 | Nakayama et al. ....... 369/275.3 |
| 6,128,270 | A | 10/2000 | Nishikawa ............... 369/275.4 |
| 6,335,916 | B1 * | 1/2002 | Endo et al. ............... 369/275.4 |

FOREIGN PATENT DOCUMENTS

| EP | 0 939 399 A2 | 9/1999 |
| JP | 59-127246 | 7/1984 |
| JP | 60-239949 | 11/1985 |
| JP | 1-155522 | 6/1989 |
| JP | 4-205721 | 7/1992 |
| JP | 10-106040 | 4/1998 |
| JP | 11-353810 | 12/1999 |

* cited by examiner

*Primary Examiner*—Nabil Hindi
(74) *Attorney, Agent, or Firm*—Renner, Otto, Boisselle and Sklar, LLP

(57) ABSTRACT

A recordable optical information medium includes a recording area including a guide groove on which a recording material layer is provided for forming at least one recording mark which represents first information modulated by a first modulation system; and a pit area including at least one concave and convex type pit which represents second information modulated by a second modulation system. The guide groove and the at least one pit have substantially the same depth. The first modulation system and the second modulation system are different from each other.

18 Claims, 10 Drawing Sheets

OPTICAL INFORMATION MEDIUM, RECORDING AND REPRODUCTION APPARATUS, AND RECORDING AND REPRODUCTION METHOD

TECHNICAL FIELD

The present invention relates to an optical information medium on which information is to be recorded or from which information is to be reproduced by a converged light beam directed thereto, and a recording and/or reproduction apparatus and a recording and/or reproduction method for recording information on or reproducing information from such an optical information medium.

BACKGROUND ART

Recently, DVDs (Digital Versatile Discs) have been widely used as optical information media (hereinafter, referred to as "optical discs"). As DVDs, there exist DVD-ROM discs for reproduction only, DVD-RW discs which are rewritable, and DVD-R discs which are of the write-once type.

A DVD-RW disc has a memory capacity of 4.7 GB, with which at least 2 hours of NTSC moving pictures are recordable. The DVD-RW disc includes an inner lead-in area and a data area which is provided to outside the lead-in area in which information such as moving pictures or the like is to be recorded. The lead-in area has concave and convex type pits formed spirally, the pits representing information such as, for example, the book type, version of the Standards, disc size, and disc structure. The data has a guide groove which wobbles minutely formed therein.

A DVD-RW disc is produced as follows. First, a master disc including a lead-in area having pits and a data area having a guide groove is produced. From the master disc, a stamper is produced. Minute features of a surface of the stamper are transferred to a plate of resin, thus forming a first resin substrate having a thickness of 0.6 mm. Then, a recording material layer containing a phase-change material is formed on a surface of the first resin substrate by sputtering or the like. A second resin substrate having a thickness of 0.6 mm is placed on the recording material layer. Thus, a DVD-RW disc having a thickness of 1.2 mm is produced. In the DVD-RW disc, the recording density of the information in the lead-in area is equal to the recording density of the information in the data area. A light beam used for recording information on the DVD-RW disc is directed to the recording material layer through the first resin substrate which is a replica, of the master disc, produced using the stamper.

The information represented by the pits formed in the lead-in area is the same among an identical type of optical discs. Therefore, in order to reduce the cost of mass-production of the optical discs, the pits in the lead-in area are preferably reproduced using a stamper by an injection technique or the like.

In general, a signal obtained by the concave and convex type pits has a progressively smaller amplitude for pits progressively shallower than $\lambda/4$. Thus, the signal-to-noise ratio (S/N ratio) of such a signal is lowered. By contrast, a signal obtained by a recording mark formed in the recording material layer on the guide groove has a progressively smaller amplitude for a progressively deeper guide groove due to the amount of light reflected by the guide groove being decreased. Thus, the S/N ratio of such a signal is lowered. In order to solve this problem, a spiral guide groove is formed to be as shallow as $\lambda/10$ to $\lambda/16$ ($\lambda$: wavelength of light) and the pits are formed to be deeper than the guide groove. Therefore, while the master disc of the DVD-RW disc is produced, the amount of light is increased for forming the pits so that the depth of the pits is substantially equal to the thickness of a resist layer, and the amount of light is decreased for forming the guide groove so that the depth of the guide groove is smaller than the thickness of the resist layer.

BS digital broadcasting has started, and thus contents having high definition images are now broadcast. Both the memory capacity and the recording speed of conventional optical discs are insufficient to accumulate such high definition images. There is a strong demand for a new optical disc having a memory capacity of as large as 25 GB and a recording speed of as high as 33 Mbps. In order to meet this demand, an optical disc for higher density recording has been developed using purple laser light having a wavelength of as short as 405 nm and an objective lens having a numerical aperture of as high as 0.85. Realization of such high density recording requires further reduction in the noise caused by the guide groove so that a signal obtained from the recording mark has a satisfactory S/N ratio.

The above-described DVD-RW disc has the following problem in fulfilling such a requirement. Since the depth of the guide groove and the depth of the pits are different from each other, it is necessary to stop a photolithography step of the resist layer when the guide groove is formed to a depth into the resist layer in the production of a master disc. Therefore, it is difficult to form the groove to have a uniform depth in the entirety thereof, and thus it is difficult to produce a master disc having a guide groove which provides a signal having a low level of noise. The yield of the master discs is reduced; namely, cutting needs to be repeated a plurality of times before obtaining one satisfactory master disc. This results in an increase in the cost of the optical discs as final products.

DISCLOSURE OF THE INVENTION

According to one aspect of the invention, a recordable optical information medium includes a recording area including a guide groove on which a recording material layer is provided for forming at least one recording mark which represents first information modulated by a first modulation system; and a pit area including at least one concave and convex type pit which represents second information modulated by a second modulation system. The guide groove and the at least one pit have substantially the same depth. The first modulation system and the second modulation system are different from each other.

In one embodiment of the invention, a recording density of the second information modulated by the second modulation system is lower than a recording density of the first information modulated by the first modulation system, and a frequency band of a reproduction signal of the second information modulated by the second modulation system is narrower than a frequency band of a reproduction signal of the first information modulated by the first modulation system.

In one embodiment of the invention, the second modulation system includes a PPM modulation system.

In one embodiment of the invention, the pit area includes a plurality of pits, and the plurality of pits have substantially the same length.

In one embodiment of the invention, the pit area includes a plurality of pits, and intervals between the plurality of pits have substantially the same length.

In one embodiment of the invention, the second modulation system includes a PE modulation system.

According to the present invention, pits are formed so that a length of each pit or a length of each inter-pit interval represents information. Due to such a structure of the optical information medium, a frequency band for detecting a signal can be narrowed. Thus, a satisfactory reproduction signal is obtained even when the pits are relatively shallow. The pits can be relatively shallow, and the guide groove can also be relatively shallow. Therefore, it is very easy to produce a master disc. Since the guide groove is relatively shallow, the amount of light reflected by the guide groove is increased, thus improving the recording density of information on the guide groove.

According to another aspect of the invention, an optical information medium for reproduction only includes a first pit area including at least one concave and convex type pit which represents first information modulated by a first modulation system; and a second pit area including at least one concave and convex type pit which represents second information modulated by a second modulation system. The at least one pit in the first pit area and the at least one pit in the second pit area have substantially the same depth. The first modulation system and the second modulation system are different from each other.

In one embodiment of the invention, a recording density of the second information modulated by the second modulation system is lower than a recording density of the first information modulated by the first modulation system, and a frequency band of a reproduction signal of the second information modulated by the second modulation system is narrower than a frequency band of a reproduction signal of the first information modulated by the first modulation system.

In one embodiment of the invention, the second modulation system includes a PPM modulation system.

In one embodiment of the invention, the second pit area includes a plurality of pits, and the plurality of pits have substantially the same length.

In one embodiment of the invention, the second pit area includes a plurality of pits, and intervals between the plurality of pits have substantially the same length.

In one embodiment of the invention, the second modulation system includes a PE modulation system.

In one embodiment of the invention, the second pit area is a lead-in area.

According to the present invention, pits are formed so that a length of each pit or a length of each inter-pit interval represents information. Accordingly, a recordable information medium, having pits and a guide groove of an identical depth and having a pit area of a fundamentally identical physical format as that of the second pit area, can be produced easily and at low cost. When the pit area of the optical information medium for reproduction only and the pit area of the recordable optical information medium are of a fundamentally identical physical format, a recording and reproduction apparatus for reproducing information from both optical information media can be produced at lower cost.

According to still another aspect of the invention, a recording apparatus is provided for recording first information on a recordable optical information medium including a recording area including a guide groove on which a recording material layer is provided for forming at least one recording mark which represents the first information modulated by a first modulation system; and a pit area including at least one concave and convex type pit which represents second information modulated by a second modulation system, wherein the guide groove and the at least one pit have substantially the same depth, and the first modulation system and the second modulation system are different from each other. The recording apparatus includes a modulation section for modulating a recording signal including the first information by the first modulation system to generat a modulation signal; and an optical head section for receiving the modulation signal and recording the first information on the recordable optical information medium.

According to still another aspect of the invention, a reproduction apparatus is provided for reproducing first information and second information from a recordable optical information medium including a recording area including a guide groove on which a recording material layer is provided for forming at least one recording mark which represents the first information modulated by a first modulation system; and a pit area including at least one concave and convex type pit which represents the second information modulated by a second modulation system, wherein the guide groove and the at least one pit have substantially the same depth, and the first modulation system and the second modulation system are different from each other. The reproduction apparatus includes a first demodulation section for demodulating a first reproduction signal including the first information modulated by the first modulation system, the first reproduction signal being reproduced from the recording area, to generate a first demodulation signal; a first read section for reading the first information from the first demodulation signal; a second demodulation section for demodulating a second reproduction signal including the second information modulated by the second modulation system, the second reproduction signal being reproduced from the pit area, to generate a second demodulation signal; and a second read section for reading the second information from the second demodulation signal.

According to the present invention, the recording mark is formed (recorded) on the guide groove using the first modulation system, and the recording mark formed (recorded) on the guide groove is reproduced using the first modulation system. Information recorded in the pit area is reproduced using the second modulation system. Thus, high density and stable recording and reproduction can be performed with certainty.

According to still another aspect of the invention, a reproduction apparatus is provided for reproducing first information and second information from an optical information medium for reproduction only including a first pit area including at least one concave and convex type pit which represents first information modulated by a first modulation system; and a second pit area including at least one concave and convex type pit which represents second information modulated by a second modulation system, wherein the at least one pit in the first pit area and the at least one pit in the second pit area have substantially the same depth, and the first modulation system and the second modulation system are different from each other. The reproduction apparatus includes a first demodulation section for demodulating a first reproduction signal including the first information modulated by the first modulation system, the first reproduction signal being reproduced from the first pit area, to generate a first demodulation signal; a first read section for reading the first information from the first demodulation signal; a second demodulation section for demodulating a second reproduction signal including the second information modulated by the second modulation system, the second reproduction signal being reproduced from the second pit area, to generate a second demodulation signal; and a second read section for reading the second information from the second demodulation signal.

According to the present invention, information recorded in the first pit area is reproduced using the first modulation system, and information recorded in the second pit area is reproduced using the second modulation system. Thus, the information in both the first pit area and the second pit area can be easily reproduced.

According to still another aspect of the invention, a method is provided for recording first information on a recordable optical information medium including a recording area including a guide groove on which a recording material layer is provided for forming at least one recording mark which represents the first information modulated by a first modulation system; and a pit area including at least one concave and convex type pit which represents second information modulated by a second modulation system, wherein the guide groove and the at least one pit have substantially the same depth, and the first modulation system and the second modulation system are different from each other. The method includes the steps of modulating a recording signal including the first information by the first modulation system to generate a modulation signal; and receiving the modulation signal and recording the first information on the recordable optical information medium.

According to still another aspect of the invention, a method is provided for reproducing first information and second information from a recordable optical information medium including a recording area including a guide groove on which a recording material layer is provided for forming at least one recording mark which represents the first information modulated by a first modulation system; and a pit area including at least one concave and convex type pit which represents the second information modulated by a second modulation system, wherein the guide groove and the at least one pit have substantially the same depth, and the first modulation system and the second modulation system are different from each other. The method includes the steps of demodulating a first reproduction signal including the first information modulated by the first modulation system, the first reproduction signal being reproduced from the recording area, to generate a first demodulation signal; reading the first information from the first demodulation signal; demodulating a second reproduction signal including the second information modulated by the second modulation system, the second reproduction signal being reproduced from the pit area, to generate a second demodulation signal; and reading the second information from the second demodulation signal.

According to still another aspect of the invention, a method is provided for reproducing first information and second information from an optical information medium for reproduction only including a first pit area including at least one concave and convex type pit which represents first information modulated by a first modulation system; and a second pit area including at least one concave and convex type pit which represents second information modulated by a second modulation system, wherein the at least one pit in the first pit area and the at least one pit in the second pit area have substantially the same depth, and the first modulation system and the second modulation system are different from each other. The method includes the steps of demodulating a first reproduction signal including the first information modulated by the first modulation system, the first reproduction signal being reproduced from the first pit area, to generate a first demodulation signal; reading the first information from the first demodulation signal; demodulating a second reproduction signal including the second information modulated by the second modulation system, the second reproduction signal being reproduced from the second pit area, to generate a second demodulation signal; and reading the second information from the second demodulation signal.

Thus, the invention described herein makes possible the advantages of providing an optical information medium which can be produced at low cost and allows information to be recorded at a high density, and an optical information medium for reproduction only which allows a recording and reproduction apparatus for reproducing information from both a recordable optical information medium and an optical information medium for reproduction only to be produced at lower cost. The invention described herein also makes possible the advantages of providing a recording and/or reproduction apparatus and a recording and/or reproduction method for recording information on or reproducing information from such an optical information medium.

These and other advantages of the present invention will become apparent to those skilled in the art upon reading and understanding the following detailed description with reference to the accompanying figures.

BEST MODE FOR CARRYING OUT THE INVENTION

Figure 1A:
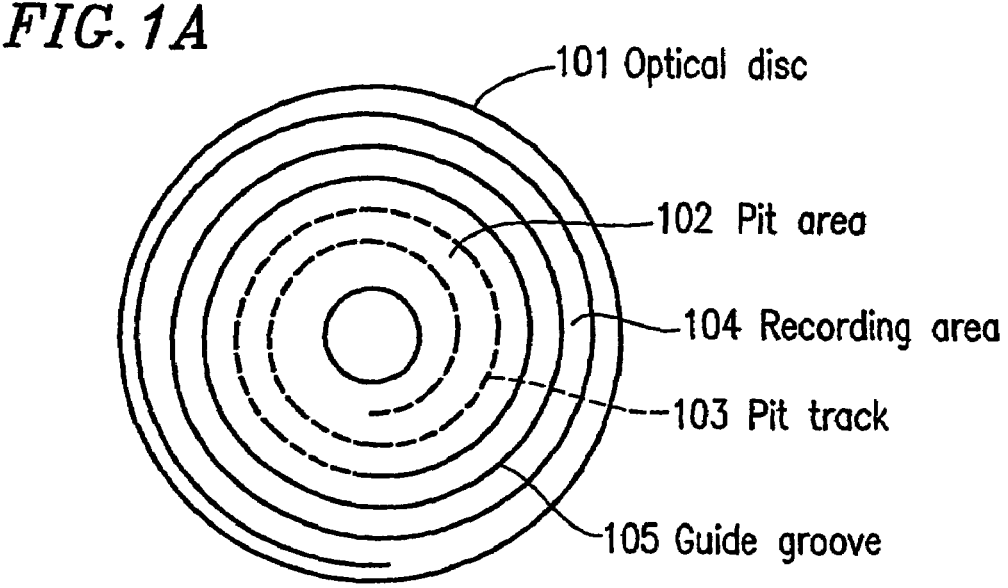
FIG. 1A is a top view of a recordable optical disc according to an example of the present invention.

A recordable optical disc according to the present invention includes a pit area having concave and convex type pits, and a recording area having recording marks formed in a recording material layer on a guide groove. The recording marks have different lengths in accordance with information. The pits or inter-pit intervals have substantially the same length. Alternatively, the pits or inter-pit intervals have different lengths in accordance with the information.

Various systems are usable for modulating information to be recorded on the guide groove of the recording area. Here, a method for recording information on the guide groove of the recording area using a 8–15 modulation system will be described. The 8–15 modulation system converts 8-bit information into a 15-bit code stream (Japanese Laid-Open Publication No. 8-287620). Information to be recorded is converted by a 8–15 modulation circuit into a 15-bit code stream, and is NRZI (Non Return to Zero Inverted)-modulated by an NRZI modulation circuit. In accordance with the NRZI-modulated channel signal, the intensity of the light beam is modulated to form a recording mark. Such a manner of recording is referred to as "PWM (Pulse Width Modulation) recording since the length of the recording mark represents information. A reproduction signal is generated by detecting both ends of the recording mark.

Pits formed in the pit area are formed by a system generally referred to as a "PPM (Pit Position Modulation system". By this system, the pits are formed so that a length of a pit or a length of an inter-pit interval represents information. A reproduction signal is generated by detecting positions of the pits or positions of the inter-pit intervals. This system can uniformize the length of the pits or inter-pit intervals, the reproduction signal can be handled by a narrow band filter. Even when the reproduction signal includes a high level of noise, the noise can be removed by the narrow band filter, resulting in a high S/N ratio of the signal.

When the information to be recorded on the guide groove and the information recorded in the pit area are modulated by an identical modulation system, the two types of information can be demodulated by the same demodulation device. Thus, the recording and reproduction apparatus can be simplified. For example, when information to be recorded on the guide groove in the recording area is modulated by a 8–15 modulation system, a 8–15-modulated code stream is NRZI-modulated and the NRZI-modulated signal is PPM-modulated. Based on the PPM-modulated signal, a master disc is produced. In this manner, the information to be recorded and a reproduction signal obtained from the pit area are of the same modulation system.

When the information to be recorded on th guide groove in the recording area and the reproduction signal obtained from the pit area are of the same modulation system, the information to be recorded on the guide groove can be recorded at a recording density which is an integer multiple of the recording density of the information recorded in the pit area. In this case, generation of a read clock is relatively easy, which lowers the production cost of the recording and reproduction apparatus. For example, the information can be recorded so that the length of the shortest inter-pit interval formed in the pit area is twice as long as the length of the shortest recording mark formed in the recording area.

Recording of information on or reproduction of information from an optical disc is performed while the light beam is tracking-controlled so as to be on the track. For a recordable optical disc, a push-pull system is generally used to detect a tracking error. When information is recorded in the pit area so that the length of each inter-pit interval represents information, the ratio of the pits with respect to the area of the pit track is increased. Thus, the quality of the tracking error signal detected by the push-pull system is enhanced. As a result, more stable tracking control is provided.

On the recordable optical disc, recording marks are formed in the recording area so that the length of each recording mark represents information, and pits are formed in the pit area so that the length of each pit or each inter-pit interval represents information. Therefore, the recording density in the pit area is lower than that of the recording area. The pit area usually has, for example, control data such as physical format information of the optical disc and information regarding the manufacture of the optical disc recorded thereon. The amount of such information is several megabytes at most, which is negligible as compared to the capacity of the pit area in which user data is to be recorded. Even though the information is recorded in the pit area at a low density, that does not cause any problem.

Various modulation systems are usable for recording information on the guide groove in the recording area. Usable known modulation systems include an EFM (Eight to Fourteen Modulation) system of converting 8-bit information into a 14-bit code stream, a 8–16 modulation system used in the DVD of converting 8-bit information into a 16 bit code stream, a (1,7) RLL modulation system, and (2,7) modulation system.

According to the present invention, the signal to be recorded on the guide groove of the recording area and the information recorded in the pit area can be modulated by different modulation systems. In this case, the pits are preferably formed in the pit area using a modulation system having a small value of Tmax/Tmin, for example, a PE (Phase Encoding) modulation system. Tmax is a maximum inversion interval (e.g., maximum pit length), and Tmin is a minimum inversion interval (e.g., minimum pit length). A signal recorded by a modulation system providing a small Tmax/Tmin value results in a reproduction signal having a narrow frequency band. Therefore, noise of the reproduction signal obtained from the pit area can be reduced so as to enhance the S/N ratio of the reproduction signal. In addition, for example, when a PE-modulated signal is further PPM-modulated, the S/N ratio is further enhanced.

In the case where the information in the recording area and the information in the pit area are modulated by different modulation systems, recording can be performed so that the length of the shortest pit in the pit area is an integer multiple of the length of the shortest recording mark in the recording area. In this manner, generation of a read clock is relatively easy, which lowers the production cost of the recording and reproduction apparatus.

The information is recorded on the optical disc by a modulation section, and the information recorded on the optical disc is reproduced by selecting a demodulation section operating in a demodulation system corresponding to the area including the information to be reproduced. Therefore, a recording and reproduction apparatus according to the present invention includes at least one modulation section and two demodulation sections. An appropriate demodulation section is selected by reading a track address or by causing the two demodulation sections to constantly operate and using one of the demodulation sections which can recognize the reproduction signal.

An optical disc for reproduction only according to the present invention includes a first pit area having concave and convex type pits which have different lengths in accordance with information, and a second pit area having concave and convex type pits so that the pits or the inter-pit intervals have substantially the same length or alternatively have different lengths in accordance with information.

Various systems are usable for modulating information to be recorded in the first pit area. Here, a method for recording information in the first pit area using a 8–15 modulation system will be described. Information to be recorded is converted by a 8–15 modulation circuit into a 15-bit code stream, and is NRZI-modulated by an NRZI modulation circuit. In accordance with the NRZI-modulated channel signal, the intensity of the light beam is modulated to form a pit. In the case of pits formed in this manner, i.e., PWM-recorded pits, the length of each pit represents information. A reproduction signal is generated by detecting of both ends of the pit.

In the case of pits formed in the second pit area, the length of each pit or each inter-pit interval represents information. A reproduction signal is generated by detecting the position of the pit or the inter-pit interval. Such a manner of recording, i.e., PPM recording, can uniformize the length of the pits or inter-pit intervals., the reproduction signal can be handled by a narrow band filter. Even when the reproduction signal includes a high level of noise, the noise can be removed by the narrow band filter, resulting in a high S/N ratio of the signal. As described above, the optical disc for reproduction only according to the present invention includes a pit area in which pits are formed by a recording system or a modulation system providing a narrow signal frequency band. Therefore, a recording optical disc, having a pit area of a fundamentally identical physical format as that of the second pit area, can include pits and a guide groove of substantially the same depth. Thus, the optical disc can be produced easily and at low cost. Additionally, a recording and reproduction apparatus capable of recording information on a recordable optical disc and reproducing information from both the recordable optical disc and an optical disc for reproduction only can be produced at lower cost.

When the information to be recorded on the first pit area and the information recorded in the second pit area are modulated by an identical modulation system, the two types of information can be demodulated by the same demodulation device for reproduction. Thus, the recording and reproduction apparatus can be simplified. For example, a master disc can be produced as follows. Information is modulated by a 8–15 modulation system and then NRZI-modulated. Based on the NRZI-modulated signal, pits are formed in the first pit area. The NRZI-modulated signal is further PPM-modulated. Based on the PPM-modulated signal, pits are formed in the second pit area.

When the information in the first pit area and the information in the second pit area are modulated by the same modulation system, recording can be performed so that the recording density of the information in the first pit area is an integer multiple of the recording density of the information in the second pit area. In this case, generation of a read clock is relatively easy, which lowers the production cost of the recording and reproduction apparatus. For example, the information can be recorded so that the length of the shortest pit or inter-pit interval in the second pit area is twice as long as the length of the shortest pit in the first pit area.

In the optical disc for reproduction only according to the present invention, pits are formed in the first pit area so that the length of each pit represents information, and pits are formed in the second pit area so that the length of each pit or inter-pit interval represents information. Thus, the recording density of the second pit area is lower than that of the first pit area. The second pit area usually has, for example, control data such as physical format information of the optical disc and information regarding the manufacture of the optical disc recorded thereon. The user data is recorded in the first pit area. The size of such control information is several megabytes at most, which is negligible as compared to the capacity of the first pit area. Even though the information is recorded in the second pit area at a low density, that does not cause any problem.

Various modulation systems are usable for recording information on the first pit area. Usable known modulation systems include an EFM (Eight to Fourteen Modulation) system of converting 8-bit information into a 14-bit code stream, a 8–16 modulation system used in the DVD of converting 8-bit information into a 16 bit code stream, a (1,7) RLL modulation system, and (2,7) modulation system.

In the optical disc for reproduction only according to the present invention, the information in the first pit area and the information in the second pit area can be modulated by different modulation systems. In this case, the pits are preferably formed in the second pit area using a modulation system having a small value of Tmax/Tmin, for example, a PE (Phase Encoding) modulation system. Tmax is a maximum inversion interval (e.g., maximum pit length), and Tmin is a minimum inversion interval (e.g., minimum pit length). When such a modulation system is used, a recordable optical disc, including a pit area which corresponds to an optical disc for reproduction only having pits formed by a modulation system providing a narrow signal frequency band, can have pits and a guide groove of substantially the same depth. Such a recordable optical disc can be produced easily and at low cost. A recording and reproduction apparatus capable of recording information on the recordable optical disc and reproducing information from both the recordable optical disc and the optical disc for reproduction only can be produced at lower cost.

Hereinafter, the present invention will be described by way of illustrative examples with reference to the accompanying drawings.

EXAMPLE 1

FIG. 1A shows a surface of a recordable optical disc 101 according to a first example of the present invention. The optical disc 101 includes a pit area 102 having a spiral pit track 103, and a recording area 104 having a spiral guide groove 105.

Figure 1B:
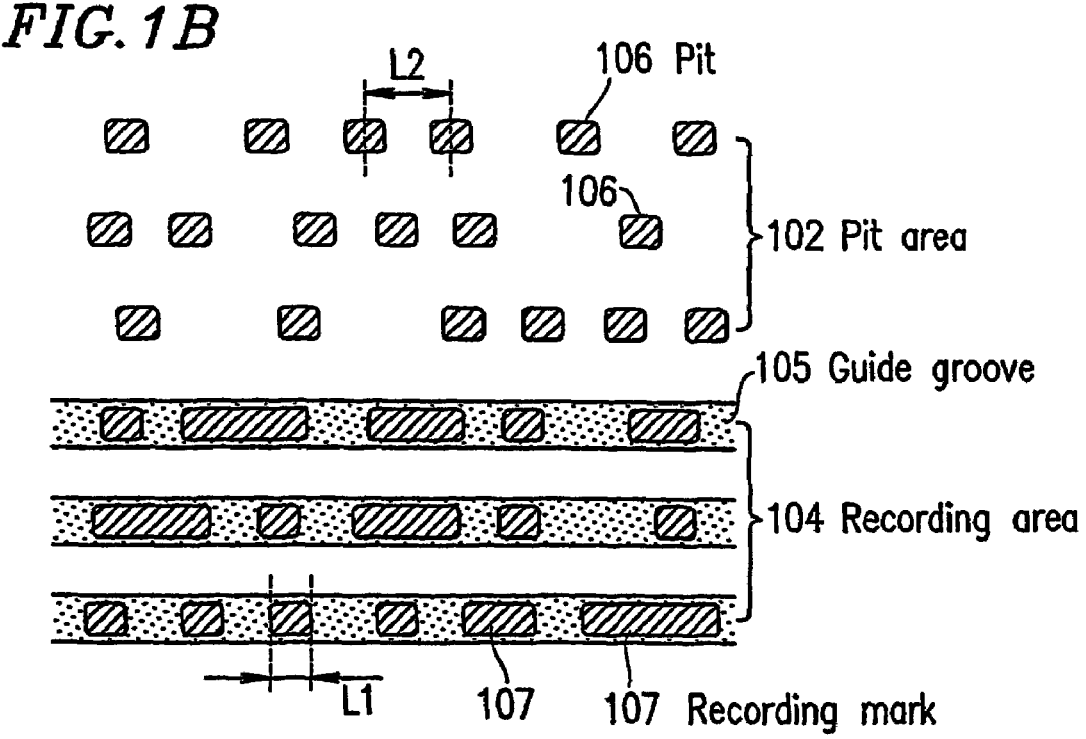
FIG. 1B is a partial enlarged view of the recordable optical disc shown in FIG. 1A.

FIG. 1B is a partial enlarged view of the optical disc 101 shown in FIG. 1A. FIG. 1B shows the pit area 102, the recording area 104, and the vicinity thereof. The pit area 102 includes a plurality of concave and convex type pits 106 having an identical size in the spiral pit track 103. The pits 106 are PPM-recorded so that a length of each inter-pit 106 interval in the pit area 102 represents information. The recording area 104 has a plurality of recording marks 107 in the spiral guide groove 105. The recording marks 107 are PWM-recorded so that a length of each recording mark 107 in the recording area 104 represents information. Here, the minimum length of the recording mark 107 in th recording area 107 is L1, and the minimum length of the inter-pit 106 intervals in the pit area 102 is L2. In the case of the optical disc 101, L2/L1 is 2. When the recording marks 107 and the pits 106 have such a relationship, it is relatively easy to produce clocks used for reproducing information by a reproduction apparatus.

Figure 2:
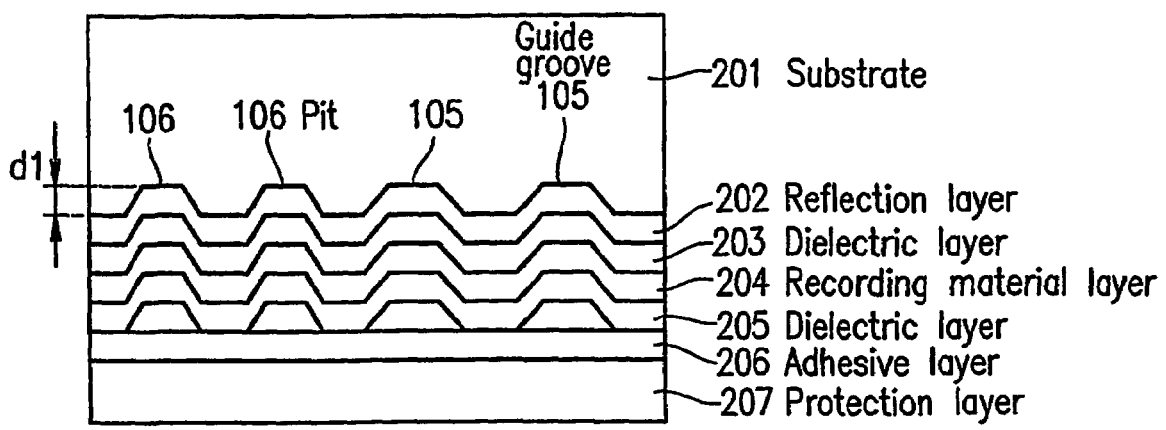
FIG. 2 is a cross-sectional view of the recordable optical disc shown in FIG. 1A.

FIG. 2 is a cross-sectional view of the optical disc 101 taken along a radial direction thereof. FIG. 2 shows a border between the pit area 102 and the recording area 104, and the vicinity thereof. A substrate 201 formed of a polycarbonate resin or the like has a guide groove 105 and the pits 106 on a surface thereof. The pits 106 and the guide groove 105 have an identical depth of d1. Depth d1 is optically $\lambda/8$ ($\lambda$ is a wavelength of a light beam) or smaller. In order to provide a sufficiently large amount of light reflected by the guide groove 105 and a sufficiently high S/N ratio of a signal obtained from the pits 106, the optical depth d1 of the pits 106 and the guide groove 105 is preferably in the range of $\lambda/10$ to $\lambda/16$.

On the substrate 201 having the guide groove 105 and the pits 106, a reflection layer 202, a dielectric layer 203 formed of $SiO_2$ or the like, a recording material layer 204, and a dielectric layer 205 are sequentially laminated in this order. A transparent protection layer 207 is bonded to the dielectric layer 205 with an adhesive layer 206 interposed therebetween. The adhesive layer 206 is also transparent. A light beam used for recording or reproducing information is incident on the protection layer 207. As the numerical aperture of an objective lens of an optical head is larger, the aberration generated by the inclination of the optical disc 101 with respect to the light beam increases, thus imp ding recording and reproduction of information. The aberration increases in proportion to a cube of the numerical aperture. As the wavelength of the light beam is shorter, the aberration also increases. In order to reduce the aberration, the wavelength of the light beam is 405 nm and the numerical aperture of the objective lens is 0.85. In this case, the protection layer 207 preferably has a thickness of as small as about 0.07 mm to about 0.12 mm.

The recording material layer 204 is formed by, for example, sputtering a phase-change material mainly containing Te (tellurium), Sb (antimony), Ge (germanium) or the like. The dielectric layers 203 and 205 are provided to protect the recording material layer 204 against humidity or a thermal impact, and can be omitted.

A phase-change material has a property of being crystallized when heated and then gradually cooled, and of being amorphous when melted and then rapidly cooled. Information is recorded on the optical disc 101 while the optical disc 101 is rotated at a prescribed speed and the light beam is tracking-controlled so as to be on the guide groove 105. In accordance with the information to be recorded, the intensity of the light beam is modulated between a level for placing the phase-change material in an amorphous state and a level for placing the phase-change material in a crystalline state. For example, in order to form a recording mark 107, a light beam having an intensity which melts the phase-change material is directed to an intended portion of the guide groove 105. Thus, the recording mark 107 is formed in an amorphous state. A portion of the guide groove 107, in which no recording mark is to be formed, is irradiated with a light beam having an intensity which does not melt the phase-change material. Therefore, a portion of the guide groove 105, except for the recording marks 107, is in a crystalline state, regardless of whether the portion was previously amorphous or crystalline. Thus, even information which has already been recorded can be overwritten.

Information recorded on the optical disc 101 is reproduced utilizing the property that a light beam is reflected at different reflectances by a portion in an amorphous state and by a portion in a crystalline state. For example, a light beam having a low constant intensity is directed to the optical disc 101, and the light reflected by the optical disc 101 is received by a light detector. Information is reproduced based on a difference in the amount of reflected light.

Figure 3A:
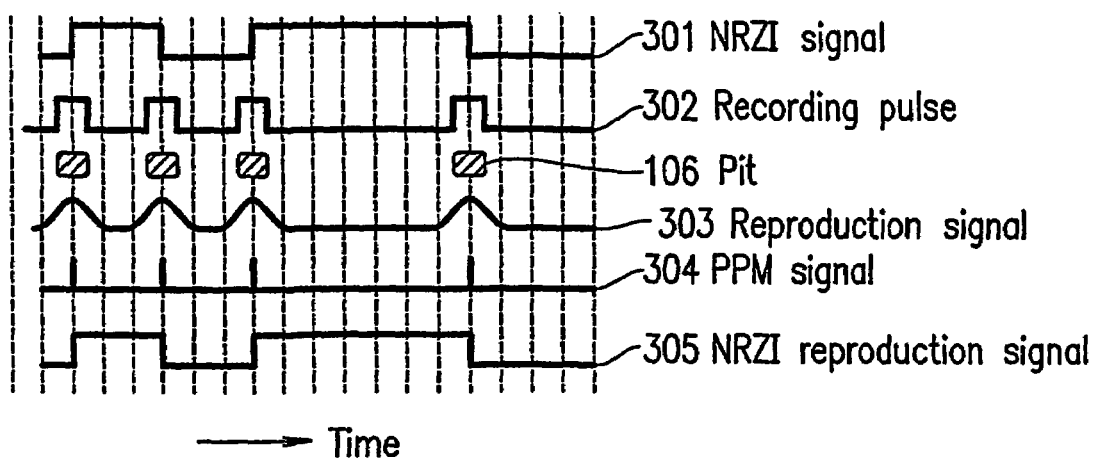
FIG. 3A is a timing diagram illustrating a manner of recording information in and reproducing information from a pit area according to an example of the present invention.

FIG. 3A is a timing diagram of a recording signal used for forming the pits 106 in the pit area 102 of a master disc (which is an optical disc 101), and a reproduction signal obtained from the optical disc 101. The horizontal axis represents time. The master disc is produced as follows. Information is 8–15-modulated and thus converted into a 15-bit code stream. The 15-bit code stream is NRZI-modulated into an NRZI signal 301 by an NRZI modulation circuit. The NRZI signal 301 is PPM-modulated by a PPM modulation circuit to generate a recording pulse 302. The intensity of the light beam is modulated based on the recording pulse 302 to form the pits 106 in the master disc. Accordingly, a reproduction signal 303 having a waveform as shown in FIG. 3A is obtained from the pits 106 of the optical disc 101. Noise in the reproduction signal 303 is removed through a filter, and the resultant reproduction signal 303 is differentiated to generate a PPM signal 304. From the PPM signal 304, an NRZI reproduction signal 305 is generated, and the information recorded on the optical disc 101 is read.

Figure 3B:
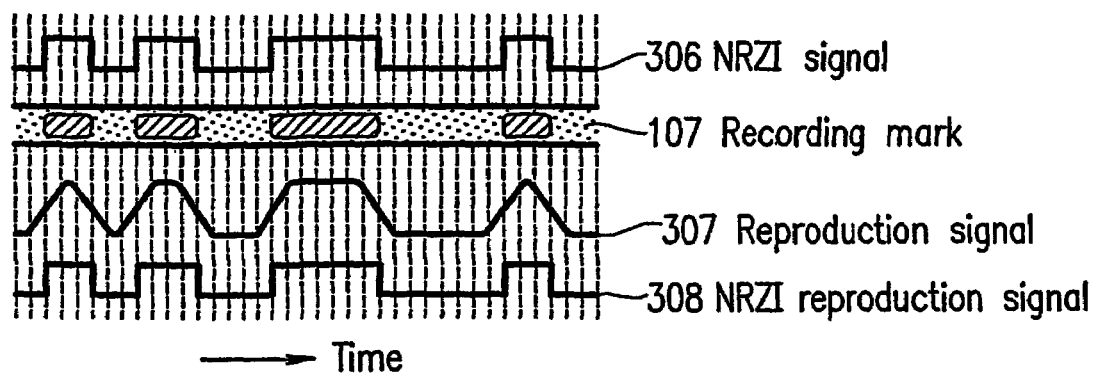
FIG. 3B is a timing diagram illustrating a manner of recording information in and reproducing information from a recording area according to an example of the present invention.

FIG. 3B is a timing diagram of a recording signal used for forming the recording marks 107 in the recording area 104, and a reproduction signal obtained from the optical disc 101. The horizontal axis represents time. Information to be recorded is 8–15-modulated and thus converted into a 15-bit code stream. The 15-bit code stream is NRZI-modulated into an NRZI signal 306 by an NRZI modulation circuit. Based on the NRZI signal 306, the intensity of the light beam is modulated to generate the recording marks 107. The information recorded on the optical disc 101 is reproduced by irradiating the recording area 104 with a light beam having a constant intensity and thus generating an NRZI reproduction signal 308 from a reproduction signal 307 obtained from the recording marks 107. Thus, the information recorded on the optical disc 101 is read.

Figure 4:
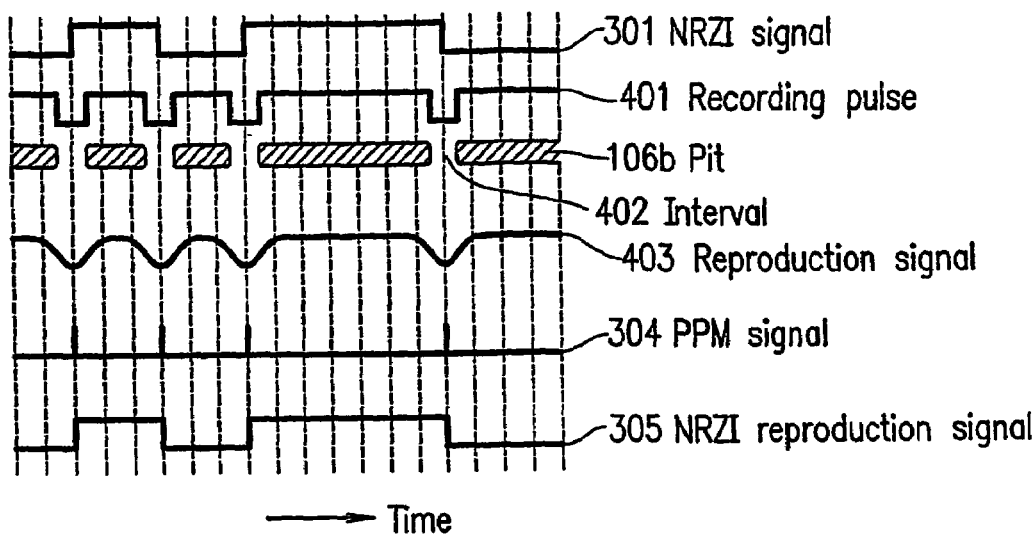
FIG. 4 is a timing diagram illustrating another manner of recording information in and reproducing information from a pit area according to an example of the present invention.

FIG. 4 is a timing diagram of a recording signal used for forming pits 106*b* in a master disc so that inter-pit 106*b* intervals 402 have an identical length, and a reproduction signal obtained from the optical disc 101. The horizontal axis represents time. The master disc is produced as follows. The NRZI signal 301 is PPM-modulated by the PPM modulation circuit to generate a recording pulse 401, which has an inverted waveform to that of the recording pulse 302 shown in FIG. 3A. The pits 106*b* are formed using the recording pulse 401. As a result, the pits 106*b* have different lengths but inter-pit 106*b* intervals 402 have an identical length. The length of each of areas between two adjacent inter-pit 106b intervals 402 (i.e., the length of each pit 106b) represent information.

From the pits 106b formed in the optical disc 101, a reproduction signal 403, which has an inverted waveform to that of the reproduction signal 303, is obtained. Noise in the reproduction signal 403 is removed through a filter, and the resultant reproduction signal 403 is differentiated to generate a PPM signal 304. From the PPM signal 304, an NRZI reproduction signal 305 is generated, and the information recorded on the optical disc 101 is read. In such a recording procedure, the frequency band of the reproduction signal 403 is the same as that of the is reproduction signal 303. As compared to the case of the pits 106, the pits 106b occupy a higher ratio of area of the pit track 103 (see FIG. 1A). Therefore, a more satisfactory tracking error signal is detected by a push-pull system. By a push-pull system, a tracking error signal is obtained when the laser beam scans pits. Accordingly, as the ratio of the area of the pit track 103 occupied by the pits 106b is higher, the tracking error signal is detected in a larger area. Therefore, the S/N ratio of the tracking signal is increased, which results in more reliable tracking control.

In the above-described example, information in the recording area 104 and information in the pit area 102 are both modulated by a 8–15 modulation system. In the recording area 104, the length of the recording marks 107 represents the information. In the pit area 102, the length of the pits 106 or the length of the inter-pit intervals 402 represents the information. The present invention is not limited to such a system.

For example, the modulation system used for forming the recording marks 107 in the recording area 104 may be different from the modulation system used for forming pits 106 or 106b in the pit area 102. In this case, the pits 106 or 106b are preferably formed using a modulation system having a small value of Tmax/Tmin, for example, a PE (Phase Encoding) modulation system. The value of Tmax/Tmin of the PE modulation system is as small as 2. When such a modulation system is used for recording information, the resultant reproduction signal has a relatively narrow frequency band. Therefore, the noise can be relatively easily removed by filtering, and thus the S/N ratio of the reproduction signal can be increased.

Figure 5:
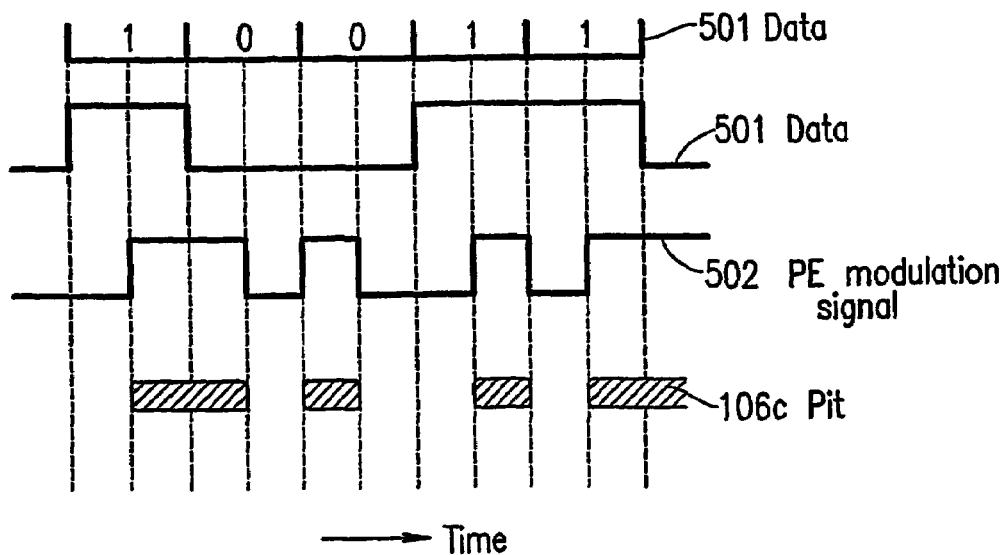
FIG. 5 is a timing diagram illustrating still another manner of recording information in and reproducing information from a pit area according to an example of the present invention.

FIG. 5 is a timing diagram of a recording signal for recording information in the pit area 102 by the PE modulation system, and pits 106c. The horizontal axis represents time. By the PE modulation system, the signal rises at the center of a data bit 1 and falls at the center of a data bit 0. When the same data bits (1 or 0) continue, the signal inverts at the border of the data bits. Data 501 is PE-modulated to obtain a PE modulation signal 502. Based on the PE modulation signal 502, the intensity of the light beam directed to a master disc is modulated to form the pits 106c. As shown in FIG. 5, the pits 106c can each have one of only two different lengths. Where the longer length of the pits 106c is 1, the shorter length of the pits 106c is ½. The value of Tmax/Tmin is as small as 2. Therefore, the frequency reproduction signal frequency band is relatively narrow. Therefore, the noise can be relatively easily removed. Where the shorter length of the pits 106c formed using the PE modulation system is substantially equal to the length of the shortest recording mark 107 formed in the recording area 104 (FIG. 1), a synchronization signal is relatively easily obtained for reproduction, and thus a recording and reproduction apparatus can be produced at lower cost.

Figure 6:
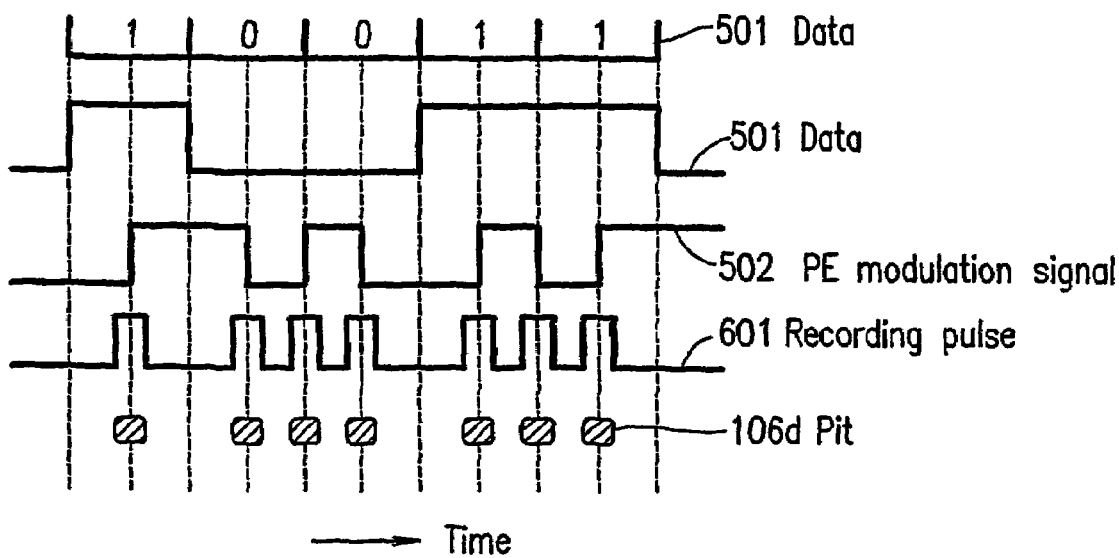
FIG. 6 is a timing diagram illustrating still another manner of recording information in and reproducing information from a pit area according to an example of the present invention.

Referring to FIG. 6, data 501 is PE-modulated to generate a PE modulation signal 502. The PE modulation signal 502 is further PPM-modulated to generate a recording pulse 601. Based on the recording pulse 601, the intensity of the light beam directed to a master disc is modulated to form pits 106d. In this case, the recording density is lowered, but a reproduction signal having a higher S/N ratio is obtained. The reading reliability of information is further enhanced.

Figure 7:
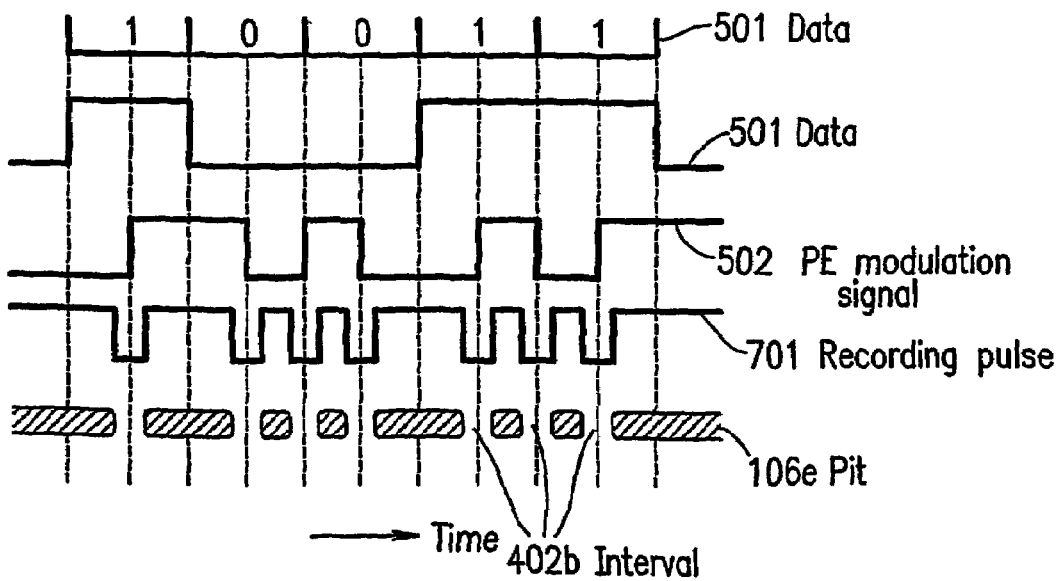
FIG. 7 is a timing diagram illustrating still another manner of recording information in and reproducing information from a pit area according to an example of the present invention.

Referring to FIG. 7, data 501 is PE-modulated to generate a PE modulation signal 502. The PE modulation signal 502 is further PPM-modulated to generate a recording pulse 701, which has an inverted waveform to that of the recording pulse 601 (FIG. 6). Based on the recording pulse 701, pits 106e are formed in the pit area 102. Due to the use of the recording pulse 701, the pits 106e have different lengths, but inter-pit 106e intervals 402b have an identical length. The length of each of areas between two inter-pit intervals 402b (i.e., the length of each pit 106e) represent information. As compared to the case of the pits 106d, the pits 106e occupy a higher ratio of area of the pit track 103 (see FIG. 1A). Therefore, a higher quality tracking error is detected by a push-pull system.

EXAMPLE 2

Figure 8A:
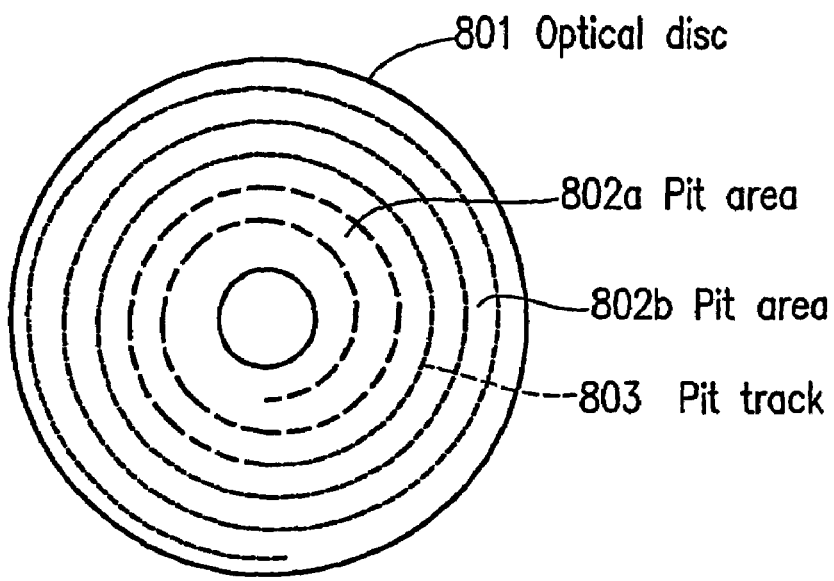
FIG. 8A is a top view of an optical disc for reproduction only according to an example of the present invention.

FIG. 8A shows a surface of a recordable optical disc 801 for reproduction only according to a second example of the present invention. The optical disc 801 includes pit areas 802a and 802b having a spiral pit track 803.

Figure 8B:
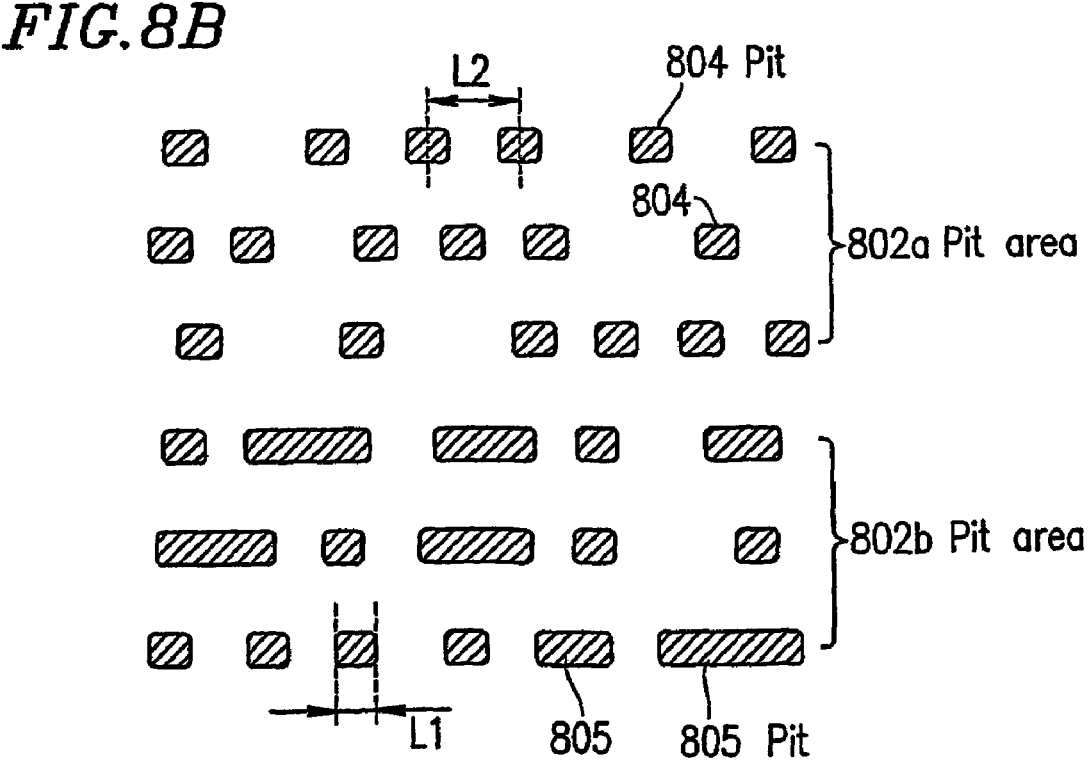
FIG. 8B is a partial enlarged view of the optical disc for reproduction only shown in FIG. 8A.

FIG. 8B is a partial enlarged view of the optical disc 801 shown in FIG. 8A. FIG. 8B shows the pit areas 802a and 802b and the vicinity thereof. The pit area 802 includes a plurality of concave and convex type pits 804 having a substantially identical size in the spiral pit track 803. The pits 804 are PPM-recorded so that a length of each inter-pit 804 interval in the pit area 802a represents information. The pit area 802b has a plurality of concave and convex type pits 805 in the pit track 803. The pits 805 are PWM-recorded so that a length of each pit 805 in the pit area 802b represents information. Here, the minimum length of the pits 805 in the pit area 802b is L1, and the minimum length of the inter-pit 804 intervals is L2. In the case of the optical disc 801, L2/L1 is 2. When the pits 804 and 805 have such a relationship, it is relatively easy to produce clocks used for reproducing information by a reproduction apparatus.

Figure 9:
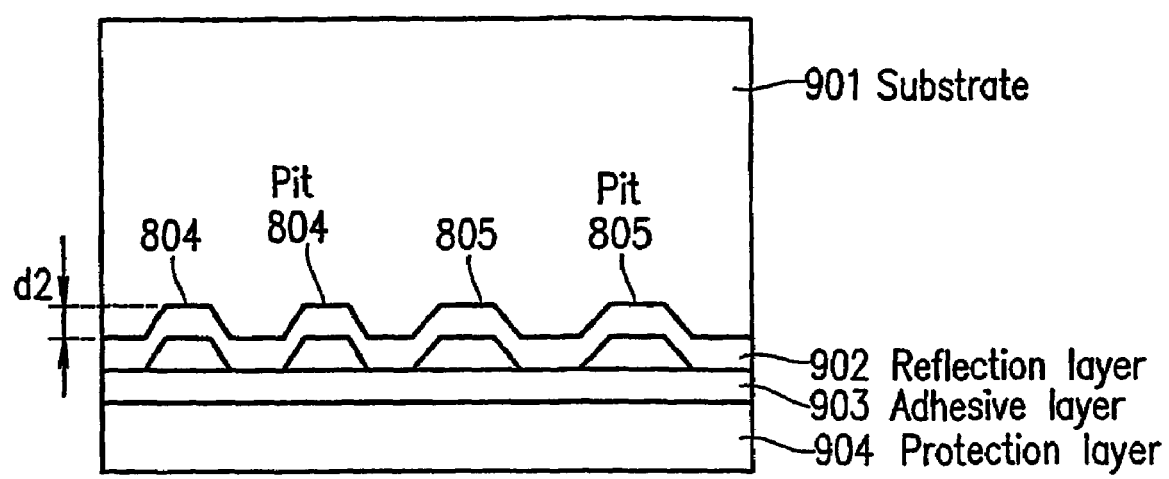
FIG. 9 is a cross-sectional view of the optical disc for reproduction only shown in FIG. 8A.

FIG. 9 is a cross-sectional view of the optical disc 801 taken along a radial direction thereof. FIG. 9 shows a border between the pit areas 802a and 802b, and the vicinity thereof. A substrate 901 has the pits 804 and 805 on a surface thereof. The pits 804 and 805 have an identical depth of d2. In general, when a tracking error signal is detected by a push-pull system, the tracking error signal has a maximum amplitude when pit depth d2 is $\lambda/8$. When pit depth d2 is $\lambda/4$, the amplitude of a reproduction signal obtained from the pits 804 and 805 is maximum, but almost no tracking signal detected in the case of the push-pull system. Accordingly, when the push-pull signal is used for detecting a tracking signal, depth d2 is $\lambda/8 \leq d2 < \lambda/4$.

Various systems are known for detecting a tracking signal used for reproducing information on the optical disc 801 for reproduction only. For example, when a 3-beam system is used, the tracking signal has a maximum amplitude when depth d2 is $\lambda/4$. Accordingly, a highest quality reproduction signal is obtained when pit depth d2 is $\lambda/4$ and the 3-beam system is used for detecting a tracking signal.

On the substrate 901 having the pits 804 and 805, a reflection layer 902 formed of aluminum or the like is provided. A transparent protection layer 904 is bonded to the reflection layer 902 with an adhesive layer 903 interposed therebetween. The adhesive layer 903 is also transparent. A light beam used for recording or reproducing information is incident on the protection layer 903. The protection layer 904 preferably has a thickness of as small as about 0.07 mm to about 0.12 mm, like the case of the protection layer 207 of the recordable optical disc 10L shown in FIG. 2.

The optical disc 801 for reproduction only has a higher reflectance and deeper pits than the recordable optical disc 101. Therefore, a reproduction signal obtained from the pit area 802a has an amplitude several times larger than that of the reproduction signal obtained from the pits 106 of the recordable optical disc 101, and is excessive in term of quality. However, by fundamentally matching the physical format of the pit area 802a of the optical disc 801 for reproduction only and the physical format of the pit area 102 of the recordable optical disc 101, a recording and reproduction apparatus capable of recording information on the optical disc 101 and reproducing information from both of the optical discs 801 and 101 can be produced at low cost. The pit area 802a usually has, for example, control data such as physical format information of the optical disc 801 and information regarding the manufacture of the optical disc 801 recorded thereon. The size of such information is several megabytes at most, which is negligible as compared to the capacity of the pit area 802b in which user data is to be recorded. Even though the information is recorded in the pit area 802a at a low density, that does not cause any problem.

Figure 10A:
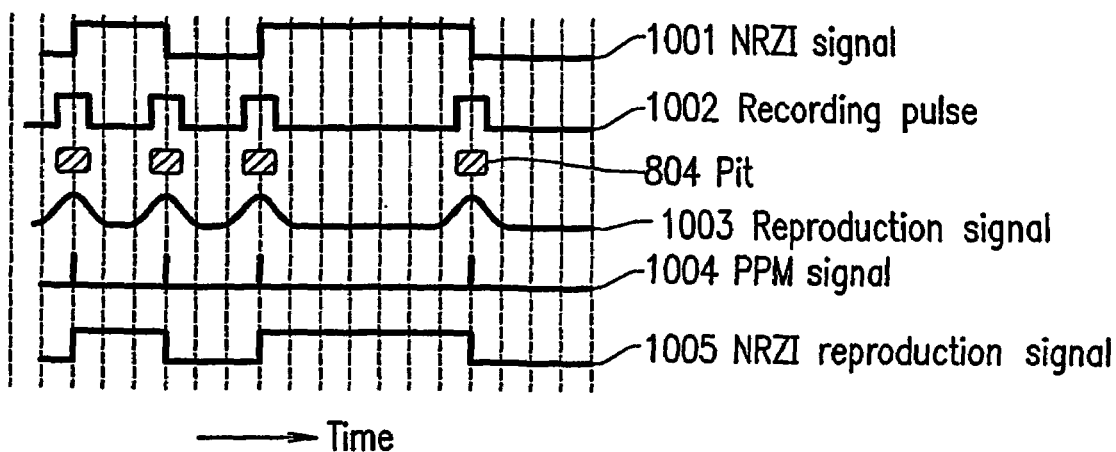
FIG. 10A is a timing diagram illustrating a manner of recording information in and reproducing information from a pit area according to an example of the present invention.

FIG. 10A is a timing diagram of a recording signal used for forming the pits 804 in the pit area 802a of a master disc (which is an optical disc 801), and a reproduction signal obtained from the optical disc 801. The horizontal axis represents time. The master disc is produced as follows. Information is 8–15-modulated and thus converted into a 15-bit code stream. The 15-bit code stream is NRZI-modulated into an NRZI signal 1001 by an NRZI modulation circuit. The NRZI signal 1001 is PPM-modulated by a PPM modulation circuit to generate a recording pulse 1002. The intensity of the light beam is modulated based on the recording pulse 1002 to form the pits 804 in the master disc. Accordingly, a reproduction signal 1003 having a waveform as shown in FIG. 10A is obtained from the pits 804 of the optical disc 801. The reproduction signal 1003 is differentiated to generate a PPM signal 1004. From the PPM signal 1004, an NRZI reproduction signal 1005 is generated, and the information recorded on the optical disc 801 is read.

Figure 10B:
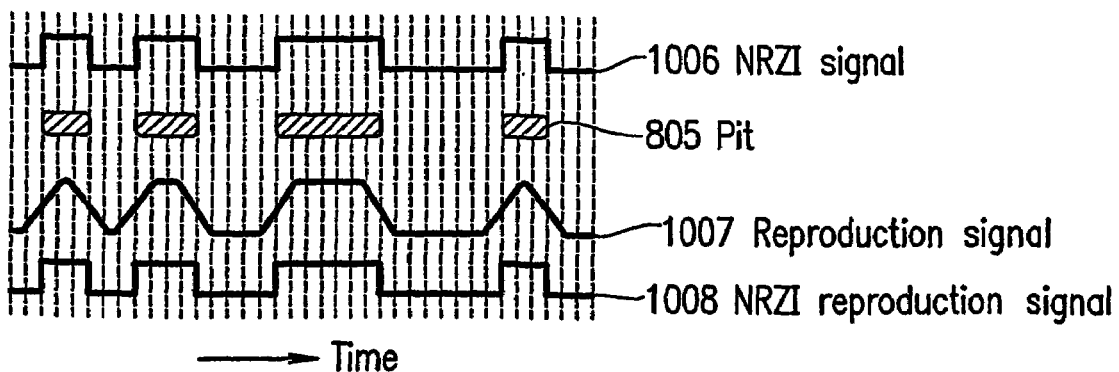
FIG. 10B is a timing diagram illustrating another manner of recording information in and reproducing information from a pit area according to an example of the present invention.

FIG. 10B is a timing diagram of a recording signal used for forming the pits 805 in the pit area 802b, and a reproduction signal obtained from the optical disc 801. The horizontal axis represents time. Information to be recorded is 8–15-modulated and thus converted into a 15-bit code stream. The 15-bit code stream is NRZI-modulated into an NRZI signal 1006 by an NRZI modulation circuit. Based on the NRZI signal 1006, the intensity of the light beam is modulated to generate the pits 805. The information recorded on the optical disc 801 is reproduced by generating an NRZI reproduction signal 1008 from a reproduction signal 1007 obtained from the pits 805. Thus, the information recorded on the optical disc 801 is read.

Figure 11A:
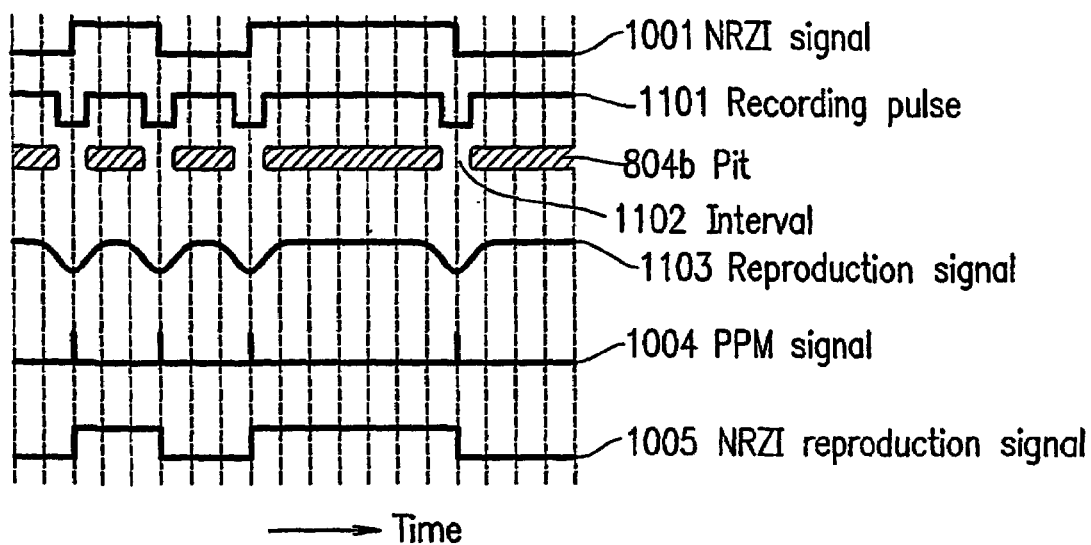
FIG. 11A is a timing diagram illustrating still another manner of recording information in and reproducing information from a pit area according to an example of the present invention.

FIG. 11A is a timing diagram of a recording signal used for forming pits 804b in a master disc so that inter-pit 804b intervals 1102 have an identical length, and a reproduction signal obtained from the optical disc 801. The horizontal axis represents time. The master disc is produced as follows. The NRZI signal 1001 is PPM-modulated by the PPM modulation circuit to generate a recording pulse 1101, which has an inverted waveform to that of the recording pulse 1002 shown in FIG. 10A. The pits 804b are formed using the recording pulse 1101. As a result, the pits 804b have different lengths but inter-pit 804b intervals 1102 have an identical length. The length of each of areas between two inter-pit 804b intervals 1102 (i.e., the length of each pit 804b) represent information.

From the pits 804b formed in the optical disc 801, a reproduction signal 1103 is obtained. The reproduction signal 1103 is differentiated to generate a PPM signal 1004. From the PPM signal 1004, an NRZI reproduction signal 1005 is generated. As compared to the case of the pits 804, the pits 804b occupy a higher ratio of area of the pit track 803 (see FIG. 8A). Therefore, a more satisfactory tracking error signal is detected by a push-pull system. In the case of a recordable optical disc including pits areas having a fundamentally identical physical format as that of the pit area 802a, the quality of the tracking error signal can be enhanced by the push-pull system.

In the above-described example, information in the recording area 802a is modulated by a PE modulation system, and information in the pit area 802b is modulated by a 8–15 modulation system. The present invention is not limited to such a system.

Figure 11B:
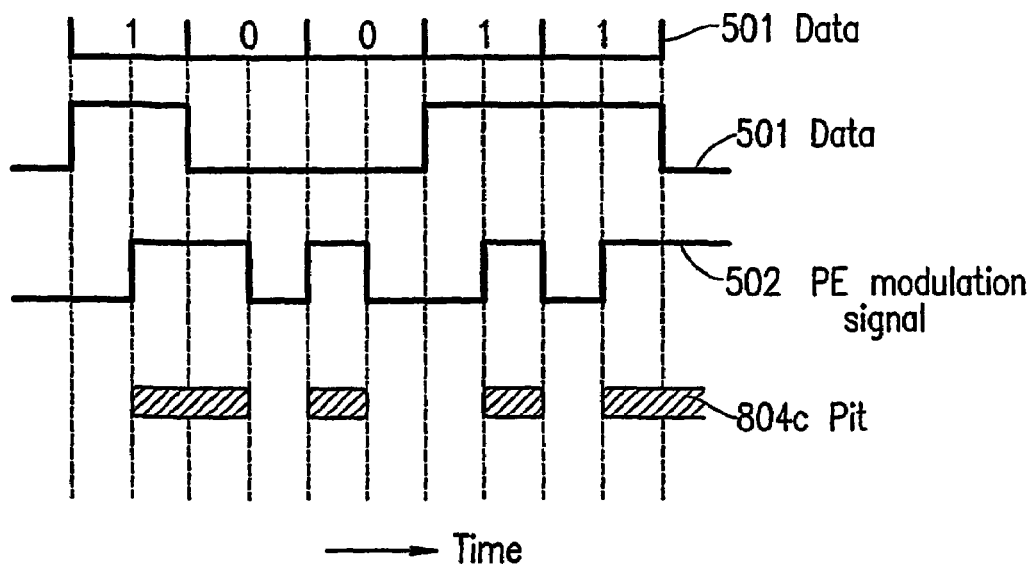
FIG. 11B is a timing diagram illustrating still another manner of recording information in and reproducing information from a pit area according to an example of the present invention.

FIG. 11B shows a timing diagram of a recording signal used for recording information in the pit area 801a by a PE modulation system, and pits 804c. The horizontal axis represents time. By the PE modulation system, the signal rises at the center of a data bit 1 and falls at the center of a data bit 0. When the same data bits (1 or 0) continue, the signal inverts at the border of the data bits. Data 501 is PE-modulated to obtain a PE modulation signal 502. Based on the PE modulation signal 502, the intensity of the light beam directed to a master disc is modulated to form the pits 804c. As shown in FIG. 11B, the pits 804c can each have one of only two different lengths. Where the longer length of the pits 804c is 1, the shorter length of the pits 804c is ½. The value of Tmax/Tmin is as small as 2. Therefore, the reproduction signal frequency band is relatively narrow. Therefore, the noise can be relatively easily removed. Where the shorter length of the pits 804c formed using the PE modulation system is substantially equal to the length of the shortest pit 805 formed in the pits area 802b (FIG. 8), a synchronization signal is relatively easily obtained for reproduction, and thus a recording and reproduction apparatus can be produced at lower cost.

In the above-described example, information in the recording area 802a is modulated by a PE modulation system, and information in the pit area 802b is modulated by a 8–15 modulation system. The present invention is not limited to such a system. For example, the information in the pit area 802a can be modulated by the modulation systems described above with reference to FIGS. 6 and 7.

The information recorded on the optical disc 101 or 801 is reproduced by selecting a demodulation section operating in a demodulation system corresponding to the area including the information to be reproduced. Therefore, a reproduction apparatus according to the present invention includes at least two demodulation sections. An appropriate demodulation section is selected by reading a track address or by causing the two demodulation sections to constantly operate and using one of the demodulation sections which can recognize the reproduction signal.

EXAMPLE 3

Figure 12:
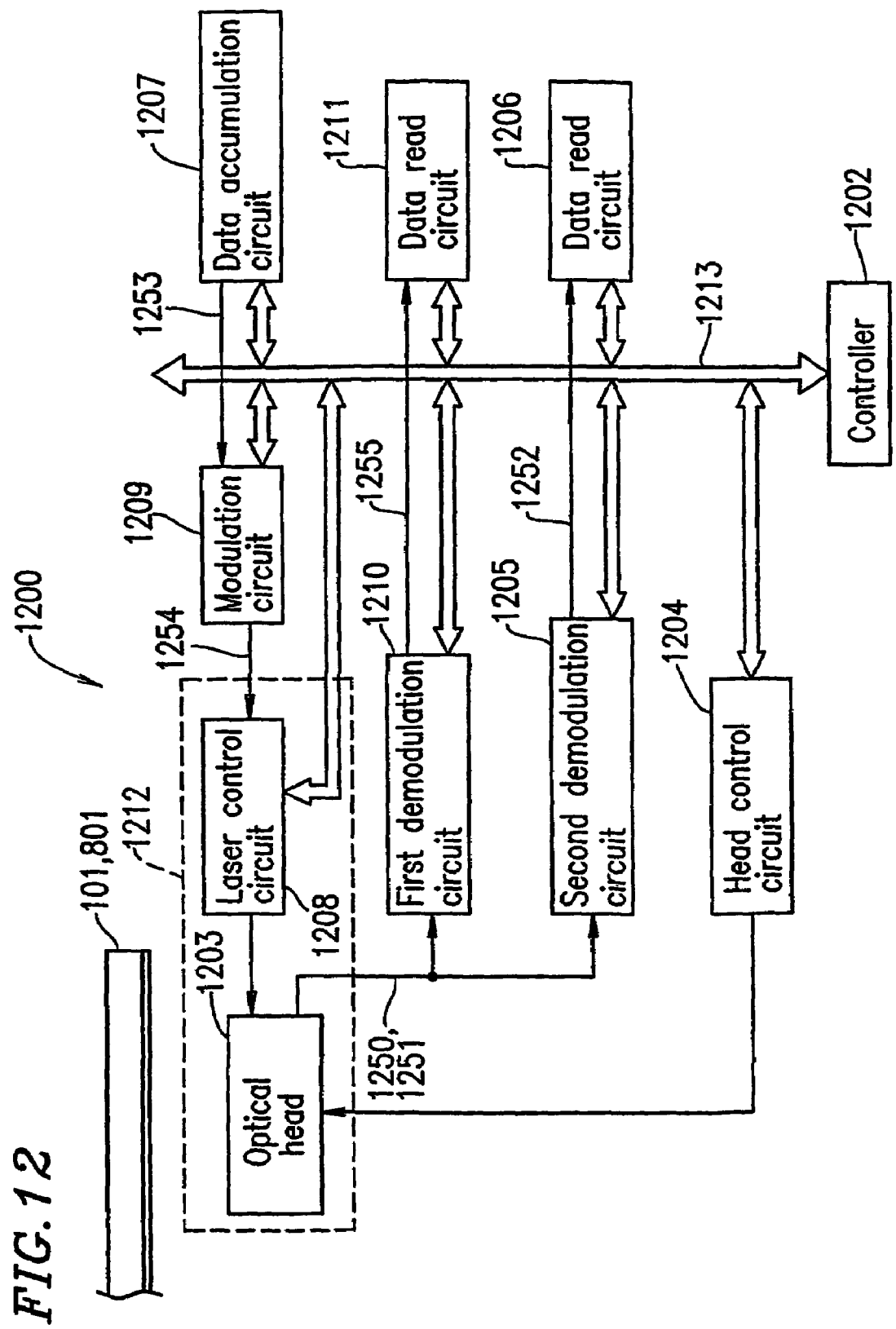
FIG. 12 is a block diagram illustrating a recording and reproduction apparatus according to an example of the present invention.

FIG. 12 is a block diagram illustrating a recording and reproduction apparatus 1200 for recording information on or reproducing information from a recordable optical disc 101 described in the first example.

The recording and reproduction apparatus 1200 includes a controller 1202, a head control circuit 1204, a second demodulation circuit 1205, a data read circuit 1206, a data accumulation circuit 1207, a modulation circuit 1209, a first demodulation circuit 1210, a data read circuit 1211, an optical head section 1212, and a data bus 1213. The optical head section 1212 includes an optical head 1203 and a laser control circuit 1208.

As described above, the depth of the pits in the pit area 102 of the optical disc 101 is substantially equal to the depth of the guide groove 105 (FIG. 1A). In the guide groove 105, information modulated by a first modulation system (for example, the 8–15 modulation system+the NRZI modulation system as shown in FIG. 3B) is recorded. The pits in the pit area 102 represent information modulated by a second modulation system (for example, the 8–15 modulation system+the NRZI modulation system+the PPM modulation system as shown in FIG. 3A or the PE modulation system as shown in FIG. 5). The first modulation system and the second modulation system are performed as described in the first and second examples.

When the optical disc 101 is mounted on the recording and reproduction apparatus 1200, the controller 1202 sends an instruction the head control circuit 1204 to locate the optical head 1203 in the lead-in area (corresponding to the pit area 102 of the optical disc 101). Next, the controller 1202 sends an instruction to the second demodulation circuit 1205 and the data read circuit 1206. The second demodulation circuit 1205 demodulates a reproduction signal 1250 modulated by the second modulation system and sent from the optical head 1203, and then sends a resultant demodulation signal 1252 to the data read circuit 1206. The data read circuit 1206 reads information recorded in the lead-in area and sends the information to the controller 1202. The controller 1202 obtains various types of information recorded in the lead-in area and performs preferable processing based on the information.

Hereinafter, a process for recording user information accumulated in the recording data accumulation circuit 1207 on the guide groove 105 (FIG. 1A) will be described.

The controller 1202 sends an instruction to the head control circuit 1204 to locate the optical head 1203 above a prescribed position of the guide groove 105. Based on the information on the recording conditions obtained from the lead-in area, the controller 1202 sets, in the laser control circuit 1208, recording conditions such as, for example, a recording pulse width and a recording power. Then, the controller 1202 sends an instruction to the data accumulation circuit 1207 having the user information to be recorded accumulated therein and to the modulation circuit 1209. The data accumulation circuit 1207 sends a recording signal 1253 including user information to the modulation circuit 1209. The modulation circuit 1209 modulates the recording signal 1253 based on the first modulation system to generate a modulation signal 1254. The modulation circuit 1209 sends the modulation signal 1254 to the laser control circuit 1208. The laser control circuit 1208 receives the modulation signal 1254 and records the user information on the guide groove 105 while modulating the intensity of the laser beam based on the recording conditions such as, for example, the recording pulse width and the recording power.

Next, a process for reproducing user information recorded on the guide groove 105 will be described.

When the optical disc 101 is mounted on the recording and reproduction apparatus 1200, the controller 1202 obtains various types of information recorded in the lead-in area in a procedure similar to that described above. The controller 1202 sends an instruction to the head control circuit 1204 to locate the optical head 1203 above a prescribed position of the guide groove 105, and sends an instruction to the first demodulation circuit 1210 and the data read circuit 1211. The first demodulation circuit 1210 demodulates a reproduction signal 1251 modulated based on the first modulation system and sent from the optical head 1203, and then sends a resultant demodulation signal 1255 to the data read circuit 1211. The data read circuit 1211 reads the user information recorded on the guide groove 105 from the demodulation signal 1255. In the case where the user information is compressed moving pictures or audio information, the compressed moving pictures or the audio information is extended (i.e., decoded) and output to a display and a speaker through a digital/analog converter or the like.

The above reproduction operation is applicable to reproduce information recorded on the optical disc 801 for reproduction only described in the second example.

A reproduction apparatus can be realized by removing the data accumulation circuit 1207 and the modulation circuit 1209 from the recording and reproduction apparatus 1200. The reproduction apparatus can reproduce information on the recordable optical disc 101 described in the first example and the optical disc 801 for reproduction only described in the second example.

In the first through third examples, the present invention is applicable to optical discs. The present invention is not limited to such an application, but is also readily applicable to, for example, a card-type, tape-type, or drum-type recording medium.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

INDUSTRIAL APPLICABILITY

According to the present invention, an optical information medium in which a guide groove on which a recording material layer is provided and a pit have substantially the same depth is provided. Since the depth of the guide groove and the depth of the pits are substantially the same, it is not necessary to stop a photolithography step when the guide groove is formed to a depth into the resist layer in the production of a master disc. Therefore, the groove can be formed to have a uniform depth in the entirety thereof only by the photolithography step. Since it is not necessary to perform a cutting step for fine-tuning the shape of the guide groove, the master disc can be produced very easily and at low cost.

According to the present invention, pits are formed in a pit area by a modulation system to reduce a recording density of information. Therefore, the reliability of reading the information can be enhanced.

According to the present invention, pits are formed in a pit area by a modulation system to narrow a reproduction signal frequency band. Therefore, the reliability of reading the information can be enhanced.

According to the present invention, information modulated using a PPM modulation system is recorded in a pit area. Since the length of the pits or the length of the inter-pit intervals is the same, the reproduction signal frequency band can be narrowed. Therefore, the pass band of a filter can be narrowed. As such, noise of a reproduction signal can be removed by filtering the reproduction signal using a filter having a narrow pass band. As a result, the S/N ratio of the reproduction signal can be improved.

According to the present invention, the length of each pit represents information while the length of the inter-pit intervals is the same. In such a system, the ratio of the pits with respect to the area of the pit track is increased, and thus a satisfactory tracking error signal can be detected by a push-pull system. As a consequence, stable tracking control is provided.

According to the present invention, information modulated using a PE modulation system providing a small Tmax/Tmin value is recorded in a pit area. A reproduction signal of information recorded by a modulation system having such a small Tmax/Tmin value has a narrow frequency band. Therefore, the pass band of a filter can be narrowed. As such, noise of the reproduction signal can be removed by filtering the reproduction signal using a filter having a narrow pass band. As a result, the S/N ratio of the reproduction signal can be improved.

According to the present invention, as described above, a reproduction signal from a pit area can be handled using a narrow band filter. Therefore, information can be read even when the pits are shallower. The guide groove, which has the same depth as that of the pits, can also be shallower. A shallower guide groove increases the amount of light reflected by the guide groove. Thus, the recording density on the guide groove can be improved.

When the information in the pit area and the information in the recording area are modulated by an identical modulation system, the information in the two areas can be demodulated by an identical demodulation device. Thus, a recording and reproduction apparatus can be produced relatively easily and at low cost.

When recording is performed so that the recording density of the information in a recording area is an integer multiple of the recording density of the information in a pit area. In this case, generation of a read clock is relatively easy, which lowers the production cost of the recording and reproduction apparatus.

An optical information medium for reproduction only according to the present invention includes a pit area in which pits are formed by a recording system or a modulation system to narrow a signal frequency band. When the signal frequency band is narrower, information can be read even when the pits are shallower. Accordingly, a recordable information medium, having a pit area of a fundamentally identical physical format as that of the pit area in the optical information medium for reproduction only, can have shallower pits. The guide groove can also be shallower. Thus, the recordable optical information medium can be produced easily and at low cost. When the information recorded in the pit area (i.e., a lead-in area) of the optical information medium for reproduction only, and the information to be recorded in the pit area of the recordable optical information medium are modulated by an identical modulation system, the number of demodulation circuits can be reduced. Therefore, a recording and reproduction apparatus capable of recording information on the recordable optical medium and reproducing information from both of the optical information medium for reproduction only and the recordable optical medium can be produced at lower cost.

The invention claimed is:

1. A recordable optical information medium, comprising:
   a recording area including a guide groove on which a recording material layer is provided for forming at least one recording mark which represents first information modulated by a first modulation system; and
   a pit area including at least one concave and convex type pit which represents second information modulated by a second modulation system,
   wherein:
   the guide groove and the at least one pit have substantially the same depth, and
   the first modulation system and the second modulation system are different from each other.

2. A recordable optical information medium according to claim 1, wherein a recording density of the second information modulated by the second modulation system is lower than a recording density of the first information modulated by the first modulation system, and a frequency band of a reproduction signal of the second information modulated by the second modulation system is narrower than a frequency band of a reproduction signal of the first information modulated by the first modulation system.

3. A recordable optical information medium according to claim 2, wherein the second modulation system includes a PPM modulation system.

4. A recordable optical information medium according to claim 3, wherein the pit area includes a plurality of pits, and the plurality of pits have substantially the same length.

5. A recordable optical Information medium according to claim 3, wherein the pit area includes a plurality of pits, and intervals between the plurality of pits have substantially the same length.

6. A recordable optical information medium according to claim 2, wherein the second modulation system includes a PE modulation system.

7. An optical information medium for reproduction only, comprising:
   a first pit area including at least one concave and convex type pit whIch represents first information modulated by a first modulation system; and
   a second pit area including at least one concave and convex type pit which represents second information modulated by a second modulation system,
   wherein:
   the second pit area is a lead-in area,
   the at least one pit in the first pit area and the at least one pit in the second pit area have substantially the same depth, and
   the first modulation system and the second modulation system are different from each other.

8. An optical information medium for reproduction only according to claim 7, wherein a recording density of the second information modulated by the second modulation system is lower than a recording density of the first information modulated by the first modulation system, and a frequency band of a reproduction signal of the second information modulated by the second modulation system is narrower than a frequency band of a reproduction signal of the first information modulated by the first modulation system.

9. An optical information medium for reproduction only according to claim 8, wherein the second modulation system Includes a PPM modulation system.

10. An optical information medium for reproduction only according to claim 9, wherein the second pit area includes a plurality of pits, and the plurality of pits have substantially the same length.

11. An optical information medium for reproduction only according to claim 9, wherein the second pit area includes a plurality of pits, and intervals between the plurality of pits have substantially the same length.

12. An optical information medium for reproduction only according to claim 8, wherein the second modulation system includes a PE modulation system.

13. A recording apparatus for recording first information on a recordable optical information medium including a recording area including a guide groove on which a recording material layer is provided for forming at least one recording mark which represents the first information modulated by a first modulation system; and a pit area including at least one concave and convex type pit which represents second information modulated by a second modulation system, wherein the guide groove and the at least one pit have substantially the same depth, and the first modulation system and the second modulation system are different from each other, the recording apparatus comprising:
    a modulation section for modulating a recording signal including the first information by the first modulation system to generate a modulation signal; and
    an optical head section for receiving the modulation signal and recording the first information on the recordable optical information medium.

14. A reproduction apparatus for reproducing first information and second information from a recordable optical Information medium including a recording area including a guide groove on which a recording material layer is provided for forming at least one recording mark which represents the first information modulated by a first modulation system; and a pit area including at least one concave and convex type pit which represents the second information modulated by a second modulation system, wherein the guide groove and the at least one pit have substantially the same depth, and the first modulation system and the second modulation system are different from each other, the reproduction apparatus comprising:
    a first demodulation section for demodulating a first reproduction signal including the first information modulated by the first modulation system, the first reproduction sIgnal being reproduced from the recording area, to generate a first demodulation signal;
    a first read section for reading the first information from the first demodulation signal;
    a second demodulation section for demodulating a second reproduction signal including the second information modulated by the second modulation system, the second reproduction signal being reproduced from the pit area, to generate a second demodulation signal; and
    a second read section for reading the second information from the second demodulation signal.

15. A reproduction apparatus for reproducing first information and second information from an optical information medium for reproduction only including a first pit area including at least one concave and convex type pit which represents first information modulated by a first modulation system; and a second pit area including at least one concave and convex type pit which represents second information modulated by a second modulation system, wherein the second pit area is a lead-in area, the at least one pit in the first pit area and the at least one pit in the second pit area have substantially the same depth, and the first modulation system and the second modulation system are different from each other, the reproduction apparatus comprising:
    a first demodulation section for demodulating a first reproduction signal including the first information modulated by the first modulation system, the first reproduction signal being reproduced from the first pit area, to generate a first demodulation signal;
    a first read section for reading the first information from the first demodulation signal;
    a second demodulation section for demodulating a second reproduction signal including the second information modulated by the second modulation system, the second reproduction signal being reproduced from the second pit area, to generate a second demodulation signal; and
    a second read section for reading the second information from the second demodulation signal.

16. A method for recording first information on a recordable optical information medium including a recording area including a guide groove on which a recording material layer is pmvided for forming at least one recording mark which represents the first information modulated by a first modulation system; and a pit area including at least one concave and convex type pit which represents second information modulated by a second modulation system, wherein the guide groove and the at ieast one pit have substantially the same depth, and the first modulation system and the second modulation system are different from each other1 the method comprising the steps of:
    modulating a recording signal including the first information by the first modulation system to generate a modulation signal; and
    receiving the modulation signal and recording the first information on the recordable optical information medium.

17. A method for reproducing first information and second information from a recordable optical information medium including a recording area including a guide groove on which a recording material layer is provided for forming at least one recording mark which represents the first information modulated by a first modulation system; and a pit area including at least one concave and convex type pit which represents the second information modulated by a second modulation system, wherein the guide groove and the at least one pit have substantially the same depth, and the first modulation system and the second modulation system are different from each other, the method comprising the steps of:
    demodulating a first reproduction signal including the first information modulated by the first modulation system, the first reproduction signal being reproduced from the recording area, to generate a first demodulation signal;
    reading the first information from the first demodulation signal;
    demodulating a second reproduction signal including the second information modulated by the second modulation system, the second reproduction signal being reproduced from the pit area, to generate a second demodulation signal; and
    reading the second information from the second demodulation signal.

18. A method for reproducing first information and second information from an optical information medium for reproduction only including a first pit area including at least one concave and convex type pit which represents first information modulated by a first modulation system; and a second pit ama including at least one concave and convex type pit which represents second information modulated by a second modulation system, wherein the second pit area is a lead-in area, the at least one pit in the first pit area and the at least one pit in the second pit area have substantially the same depth, and the first modulation system and the second modulation system are different from each other, the method comprising the steps of:

demodulating a first reproduction signal including the first information modulated by the first modulation system, the first reproduction signal being reproduced from the first pit area, to generate a first demodulation signal;

reading the first information from the first demodulation signal;

demodulating a second reproduction signal including the second information modulated by the second modulation system, the second reproduction signal being reproduced from the second pit area, to generate a second demodulation signal; and reading the second information from the second demodulation signal.

* * * * *

UNITED STATES PATENT AND TRADEMARK OFFICE
CERTIFICATE OF CORRECTION

PATENT NO. : 7,079,477 B2  Page 1 of 1
APPLICATION NO. : 10/381964
DATED : July 18, 2006
INVENTOR(S) : Mitsuro Moriya and Hiromichi Ishibashi It is certified that error appears in the above-identified patent and that said Letters Patent is hereby corrected as shown below:

Column 20, line 33, "Information" should read -- information --;
    line 42, "whIch" should read -- which --; and
    line 67, "Includes" should read -- includes --.

Column 21, line 2, "whereIn" should read -- wherein --;
    line 32, "Information" should read -- information --;
    line 46, "sIgnal" should read -- signal --; and
    line 65, "lead-in area." should read --lead-in area, --;

Column 22, line 21, "pmvided" should read -- provided --;
    line 26, "ieast" should read -- least --;
    line 28, "other1" should read -- other,--; and
    line 67, "ama" should read -- area --.

Signed and Sealed this

Twentieth Day of February, 2007

JON W. DUDAS
*Director of the United States Patent and Trademark Office*